United States Patent
Sawyer et al.

(10) Patent No.: US 6,356,757 B1
(45) Date of Patent: Mar. 12, 2002

(54) METHOD AND APPARATUS FOR TRACKING TRUCK GROUPS BETWEEN WIRELESS AND WIRELINE APPLICATIONS

(75) Inventors: Albert Joseph Sawyer, Wheaton; Robert Dennis Schweickert, Aurora; James Joseph Sowa, Naperville; Robin Jeffrey Thompson, Batavia; Alex Lawrence Wierzbicki, Bolingbrook, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/154,696

(22) Filed: Sep. 17, 1998

(51) Int. Cl.7 ............................................ H04Q 7/20
(52) U.S. Cl. ..................... 455/445; 455/560; 455/426
(58) Field of Search .................. 455/461, 433, 455/432, 445, 560, 561, 426; 379/242, 229, 230, 211, 220

(56) References Cited

U.S. PATENT DOCUMENTS 5,901,359 A * 5/1999 Malmstrom ................. 455/461
6,018,737 A * 1/2000 Shah et al. .................. 455/461
6,125,113 A * 9/2000 Farris et al. ............. 379/93.01
6,266,526 B1 * 7/2001 Kim ............................ 455/426

* cited by examiner

Primary Examiner—Wing F. Chan
Assistant Examiner—Melur Ramakrishnaiah

(57) ABSTRACT

The sharing of trunk groups is accomplished by performing incoming call routing analysis on the incoming call to determine if the call is intended for wireless applications on the network or for wireline applications on the network. The results of the incoming call routing analysis form the basis for determining those actions necessary to process the call. If the incoming call is wireless, executing the wireless related application code, notify the mobile switching center of the incoming call, and wait for directions. If the incoming call in wireline, attempting to deliver the call to a particular wireline, fire an advanced intelligent network (AIN) terminating trigger, and tandem the call through to another switch. Outgoing calls are simply allowed to hunt across shared trunk groups rather than being limited to trunk groups specified for the application.

24 Claims, 10 Drawing Sheets

*FIG. 4*

DIGIT ANALYSIS SELECTOR (DAS)

USE INDIT — 66

INCOMING DIGIT INTERPRETER TABLE (INDIT)

USE LDIT — 68

LOCAL DIGIT INTERPRETER TABLE (LDIT) — 70

CURRENT DIGIT — 72:
- = 0 USE LDIT
- = 1 USE LDIT
- = 2 USE LDIT
- = 3 USE LDIT
- = 4 USE LDIT
- = 5 USE LDIT
- = 6 USE LDIT
- = 7 USE LDIT
- = 8 USE LDIT
- = 9 USE LDIT

LDIT 1 — 2ND DIGIT — 74:
- = 0 USE LDIT
- = 1 USE LDIT
- = 2 USE LDIT
- = 3 USE LDIT
- = 4 USE LDIT
- = 5 USE LDIT
- = 6 USE LDIT
- = 7 USE LDIT
- = 8 USE LDIT
- = 9 USE LDIT

LDIT 10 — 3RD DIGIT — 76:
- = 0 TEST CALL — 100 TEST CALL
- = 1 REORDER
- = 2 TEST CALL — 102 TEST CALL
- = 3 TEST CALL — 103 TEST CALL
- = 4 TEST CALL — 104 TEST CALL
- = 5 TEST CALL — 105 TEST CALL
- = 6 REORDER
- = 7 REORDER
- = 8 TEST CALL — 108 TEST CALL
- = 9 REORDER

LDIT 2 — 2ND DIGIT — 74:
- = 0 USE LDIT
- = 1 USE LDIT
- = 2 USE LDIT
- = 3 USE LDIT
- = 4 USE LDIT
- = 5 USE LDIT
- = 6 USE LDIT
- = 7 USE LDIT
- = 8 USE LDIT
- = 9 USE LDIT

LDIT 26 — 3RD DIGIT — 76:
- = 0 ROUTE — 260 (WIRELINE)
- = 1 ROUTE — 261 (WIRELINE)
- = 2 ROUTE — 262 (WIRELINE)
- = 3 ROUTE — 263 (WIRELINE)
- = 4 ROUTE — 264 (WIRELINE)
- = 5 REORDER — 265 UNASSIGNED
- = 6 ROUTE — 266 (WIRELINE)
- = 7 WIRELESS — 267 (WIRELESS)
- = 8 ROUTE — 268 (WIRELINE)
- = 9 ROUTE — 269 (WIRELINE)

LDIT 9 — 2ND DIGIT — 74:
- = 0 USE LDIT
- = 1 USE LDIT
- = 2 USE LDIT
- = 3 USE LDIT
- = 4 USE LDIT
- = 5 USE LDIT
- = 6 USE LDIT
- = 7 USE LDIT
- = 8 USE LDIT
- = 9 USE LDIT

LDIT 97 — 3RD DIGIT — 76:
- = 0 ROUTE — 970 (WIRELINE)
- = 1 ROUTE — 971 (WIRELINE)
- = 2 REORDER — 972 UNASSIGNED
- = 3 ROUTE — 973 (WIRELINE)
- = 4 ROUTE — 974 (WIRELINE)
- = 5 ROUTE — 975 (WIRELINE)
- = 6 ROUTE — 976 (WIRELINE)
- = 7 ROUTE — 977 (WIRELINE)
- = 8 ROUTE — 978 (WIRELINE)
- = 9 ROUTE — 979 (WIRELINE)

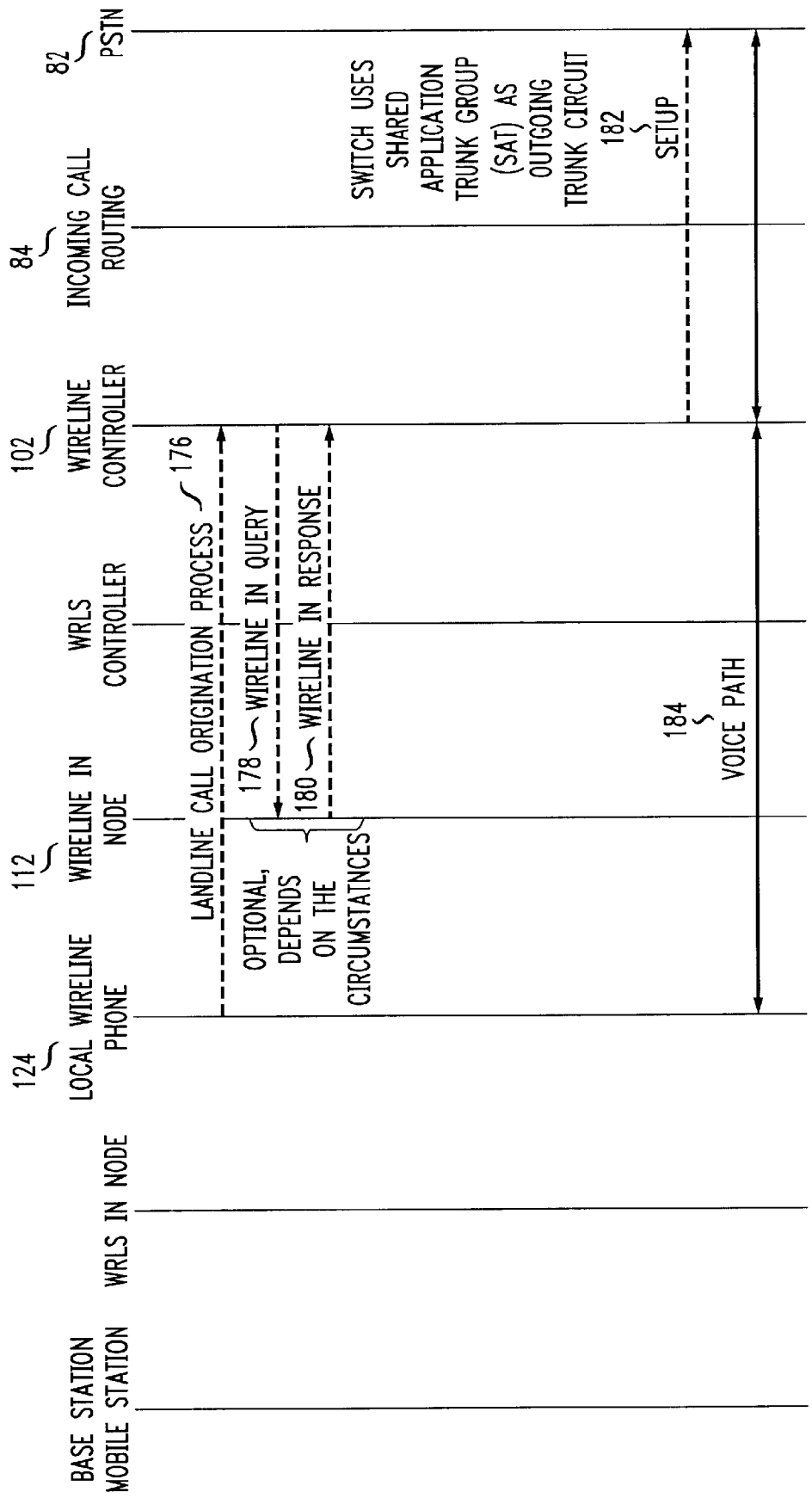

METHOD AND APPARATUS FOR TRACKING TRUCK GROUPS BETWEEN WIRELESS AND WIRELINE APPLICATIONS

FIELD OF THE INVENTION

This invention relates to trunk groups connecting telecommunication switches supporting both wireless and wireline traffic.

BACKGROUND

Currently some telecommunication switches can support cellular traffic as well as wireline services. When telecommunication switches have this type of capability, they are often referred to as having a Landline Cellular Option (LCO). An example of this type of switch is a Lucent 5ESS-2000 switch. Currently, trunk groups supporting LCO switches can carry either cellular traffic or wireline traffic, but not both. When the trunk group is placed into service, the trunk type (wireless or wireline) is assigned. This trunk group assignment is used to determine the application code for incoming and outgoing calls on each trunk group. Therefore, wireless and wireline traffic routing through the telecommunication switch must be separated and carried on a specific trunk group supporting the traffic type. Within the switch itself, loop around trunks connect the wireless and wireline components creating inefficient use of switch resources and a double handling of each call.

A need exists for trunk groups that can carry both wireless and wireline traffic and that provides a mechanism for determining whether an incoming call is a wireless or wireline call on a per call basis. Solving this problem would minimize administrative overhead, duplicative call handling by elimination of the loop around trunks, and maximization of executing the correct software code based on the wireless/wireline determination.

In addition, a need exists to provide a service provider with the ability to process both wireless and wireline applications for tandem, toll, business or residential services on the same switch and trunk groups. By providing shared trunk groups, the service providers would not require the local exchange carriers or the interLATA exchange carriers to split the traffic between wireless and wireline trunks coming into their system, or worse, tandem all wireless call through the wireline portion of the switch to separate the traffic if the connecting service provider lacks the capability to separate the traffic.

Another problem is that wireless and wireline traffic peak at different times during the day. Having trunk groups that carry both wireless and wireline traffic, would allow the peaks to offset lower usage and would maximize network resources.

SUMMARY

The capability of carrying cellular and wireline traffic on the same trunk groups is accomplished by performing incoming call routing analysis on the incoming call to determine if the call is intended for wireless applications or for wireline applications on the network. The results of the incoming call routing analysis form the basis for determining those actions necessary to process the call. If the incoming call is wireless, the wireless related application code is executed, the mobile switching center controller is notified of the incoming call, and the mobile switching center waits for directions. If the incoming call is a wireline call, the switch attempting to deliver the wireline call may transmit an advanced intelligent network terminating trigger, and the call is delivered to a landline phone or tandemed through to another switch. Outgoing calls are allowed to hunt across shared trunk groups rather than being limited to trunk groups specified for the application.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

FIG. 4 illustrates a block diagram of an incoming call routing analysis routine for supporting shared trunk groups.

FIG. 10 illustrates a message flow diagram for an origination wireline call transmission to the public switched telephone network.

DETAILED DESCRIPTION OF THE PREFERRED EMBODIMENTS

Figure 1:
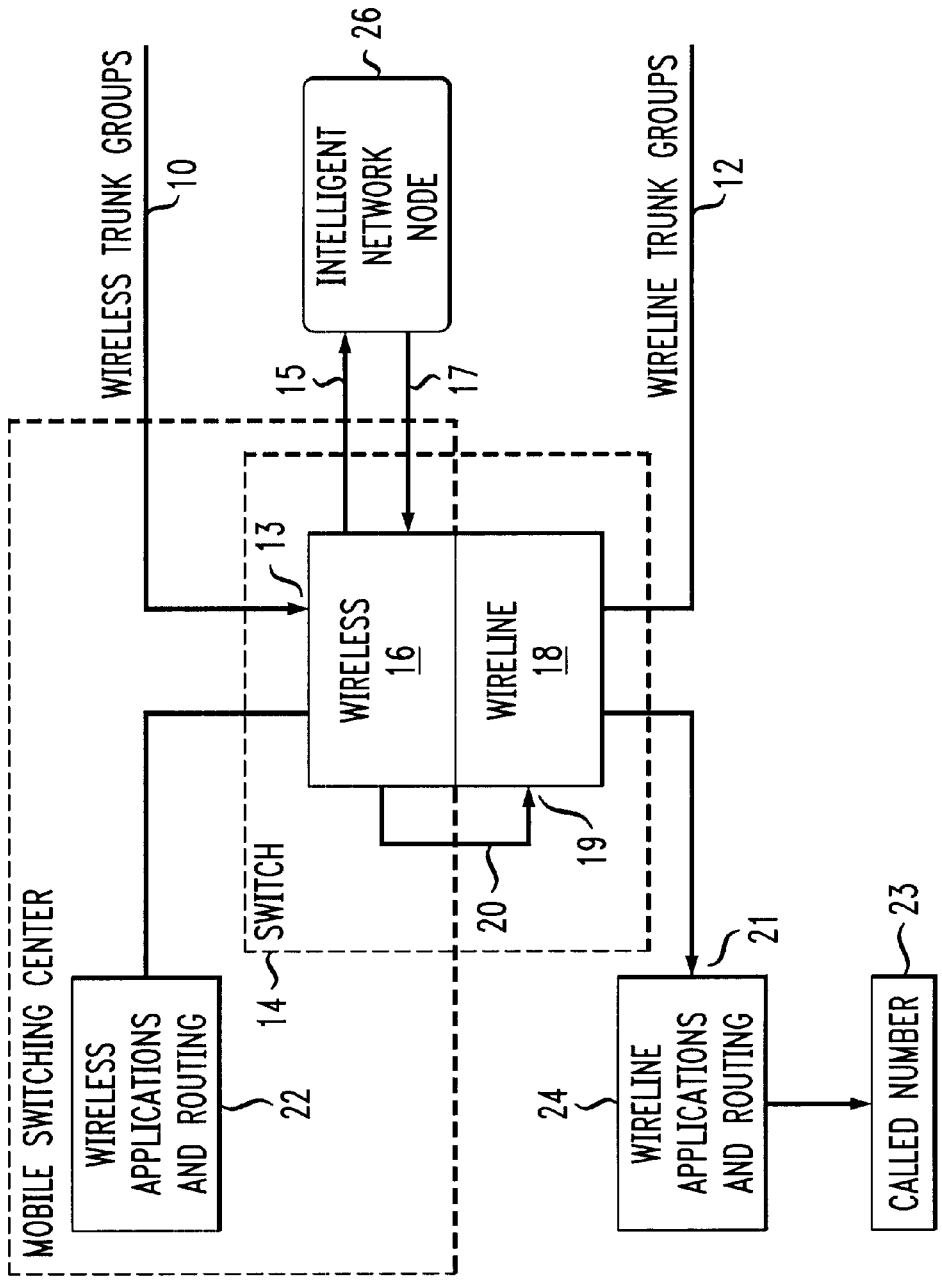
FIG. 1 illustrates a prior art diagram of the current arrangement of separate wireless and wireline trunk groups for a telecommunication switch.

FIG. 1 illustrates a prior art, block diagram of the current arrangement of separate wireless and wireline trunk groups for a telecommunication switch 14. Currently, wireless trunk group 10 and wireline trunk groups 12 are classified as wireless or wireline when the trunk groups are installed into the telecommunication switch 14 (the components of telecommunication switches are well known in the art). The telecommunication switch 14 partitions traffic into distinct wireless traffic 16 and non-wireless traffic 18. Loop around trunks 20 connect the separate partitions 16 and 18. However, the loop around trunks 20 connecting the wireless applications 22 and the wireline applications 24 are inefficient uses of switch resources and require handling each call at least two times. Therefore, the wireless traffic 16 and the wireline traffic 18 routing through the telecommunication switch 14 must be separated and carried on different trunk groups in the current network configuration scheme. For handling both wireless and wireline environments, the telecommunication switch is usually part of a mobile switching center complex which are well known in the art.

An incoming wireless call 13 enters the switch 14 via a wireless trunk group 10, and is routed to the components 16 in the switch 14 that support wireless calls. Digit analysis is performed on the called number and a message 15 may be sent to the intelligent network 26 to obtain information regarding routing instructions. In this example, the instructions from the intelligent network 26 instruct 17 the switch 14 to route the call to a wireline called number. The call is routed 19 from the components 16 in the switch 14 supporting wireless calls 16, though the loop around trunks 20 to the components 18 of the switch 16 that support wireline call. The call is then routed 21 via wireline applications 24 to the called number 23.

Figure 2:
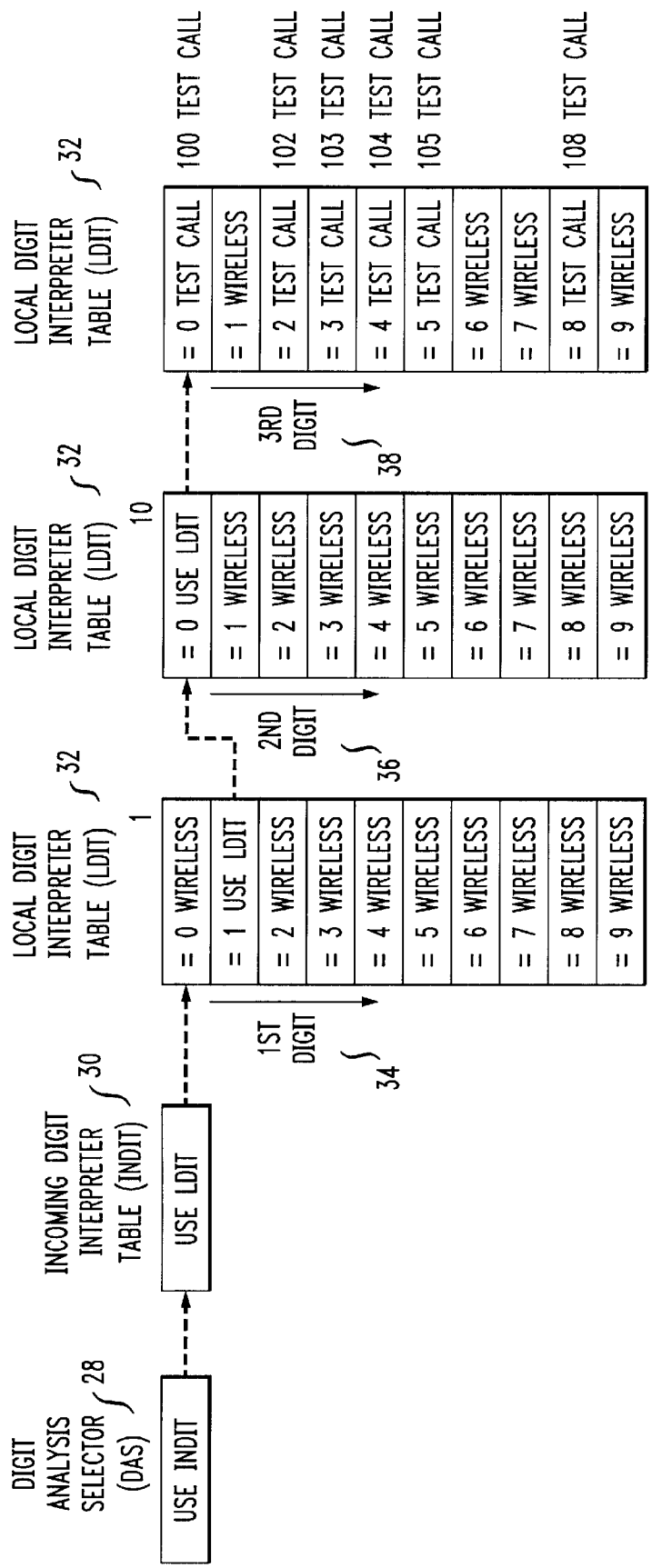
FIG. 2 illustrates a prior art, block diagram of an incoming call routing analysis routine for supporting wireless or wireline trunk groups.

FIG. 2 illustrates a prior art, block diagram of a wireless digit analysis routine for supporting wireless trunk groups. Since the trunk group is classified upon installation as to wireless or wireline, in this example, all incoming calls except test calls are assumed to be wireless and are handed by wireless call processing components. Because of the wireless classification, wireline calls would not use this trunk. This incoming trunk group is associated with a wireless digit analysis selector (DAS) 28. The DAS selects the incoming digit interpreter table (INDIT) 30 to use in the analysis. The INDIT 30 selects the local digit interpreter table (LDIT) 32 for the digit interpretation. The first incoming digit 34 indicates the appropriate LDIT 32 to use. Digit interpretation continues with the LDIT 32 if the digit is a "1". All other digits result in a completion of digit interpretation and a "wireless" result as indicated. The second incoming digit 36 is used to again access the LDIT 32. Digit interpretation continues with the LDIT if the digit is a "0."All other digits result in a completion of digit interpretation and a "wireless" result. The third incoming digit 38 is also used to again access the LDIT 32. Digit interpretation completes and returns "test call" if the digit is a valid test call digit. In this example, the third digit indicates a test call. Incoming digits 2, 3, 4, 5, and 8 would have similarly resulted in test call interpretations. All other digits would have resulted in a completion of digit interpretation and a result of a "wireless" indication. A similar analysis would indicate a wireline incoming call routing if the preexisting trunk group was defined as a wireline trunk (not shown).

An incoming call on a shared trunk 40 is routed to the switch 14. The switch 14 performs an incoming call routing analysis 42 of the called number digits. The incoming call routing 42 selects the wireless switch components 44 or the wireline switch components 46 for call handling purposes. The wireless switch components 44 or the wireline switch components 46, depending upon the components selected, may, if appropriate, transmit a request 48 and receives a reply 50 containing routing instruction messages from the intelligent network 26. The internal logic or routing instructions received from the intelligent network 26 allow the wireless applications 22 or wireline application 24 to routing the call to the called number.

Figure 3:
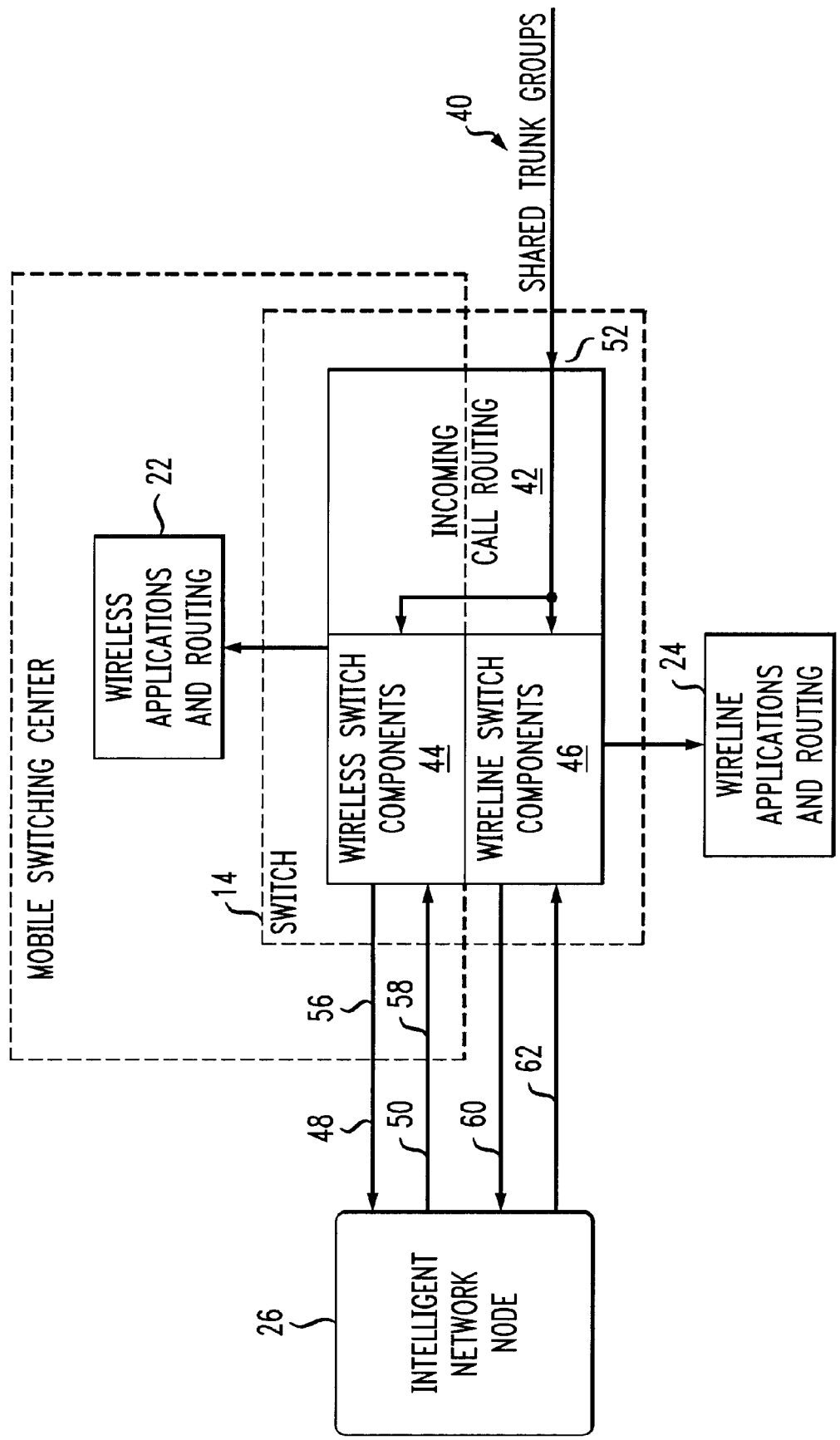
FIG. 3 illustrates a block diagram of the switch supporting shared trunk groups.

FIG. 3 illustrates an example of the flexibility enjoyed with shared trunk groups in a complex routing scheme described as routing by time of day. Suppose an individual has a work telephone number (403) 555-1234. This number is given to customers, clients, family or friends. With arrangements with the local telecommunications provider, this individual can subscribe to a "follow me routing" service. Call routing instructions for (403) 555-1234 are loaded into the intelligent network and can be changed periodically. If someone calls this number between 8 a.m. and 5 p.m., the calling party reaches the individual at their office. During commuting times 7 a.m. to 8 a.m. and 5 p.m. to 6 p.m., this individual can still be reached at (403) 555-1234. When the incoming call 52 from a shared trunk group 40 reaches the local office switch 14 for the number (403) 555-1234, incoming call routing analysis 42 is performed on the called number. The incoming call routing analysis 42 provides the selection as to whether wireless switch components 44 or wireline switch components 46 are used. If the wireless switch components 44 are used, message 56 is sent to the intelligent network 26 and routing instructions 58 are returned to the wireless switch components 44. Likewise, if wireline switch components 46 were selected after the incoming call routing analysis 42, then message 60 would be sent to the intelligent network 26 and the routing instructions 62 would be returned to the wireline switch components 46. If the incoming call to (403) 555-1234 is made during the commuting times, the intelligent network sends routing instructions for the call to be routed using wireless applications 22 to the individual's cellular number (403) 555-4567. If the call is made between the hours of 6 p.m. and 7 a.m., the intelligent network sends routing instructions to route the incoming call to the individual's home number (403) 555-8888 using wireline applications 24. In this example, the incoming call is handled on a trunk group carrying both wireline and wireless calls and the incoming call routing sorts their handling in the switch 14. Other routing schemes are well known in the art and are associated with the implementation of intelligent network services (e.g., routing by day of week, routing by day of year, routing by caller location).

FIG. 4 illustrates a block diagram of a digit analysis routine for supporting shared trunk groups. This example is meant to illustrate the concept of shared wireless/wireline digit interpretation and is not meant to depict a fully provisioned digit interpretation implementation. Unlike prior art systems where incoming calls are assumed as either wireless or wireline (except test calls), all incoming calls are analyzed by switching software using databases to support wireless, wireline, or a test calls by a comparison with the local digit interpreter table (LDIT). In the example of FIG. 4, incoming digit strings beginning are assumed as 10× are test calls, 267 are wireless calls, and 979 are wireline calls.

The incoming trunk group is defined as a "shared" trunk group within the call processing software and associated with a predetermined digit analysis selector (DAS) 66. In parallel with incoming digit reception, the switching software starts to analyze the called number digit string. The switching module processor determines through incoming call routing analysis whether additional routing assistance is required from the intelligent network. The DAS 66 indicates which incoming digit interpreter table (INDIT) 68 to use. The INDIT 68 selected in the incoming call routing analysis determines the predetermined local digit interpreter table (LDIT) 70 for additional analysis.

The first incoming digit 72 is used to access the LDIT 70. In this example, digit interpretation continues with the LDIT 70 for any first dialed digit. The second incoming digit 74 is used to access the LDIT 70. Again, digit interpretation continues with the LDIT 70 for any second dialed digit 74. The third incoming digit 76 is used to access the LDIT 70. In the example in FIG. 4, incoming call routing analysis on the digits (100) indicate a test call. Digits (267) and (979) indicate wireless and wireline calls respectively.

Figure 5:
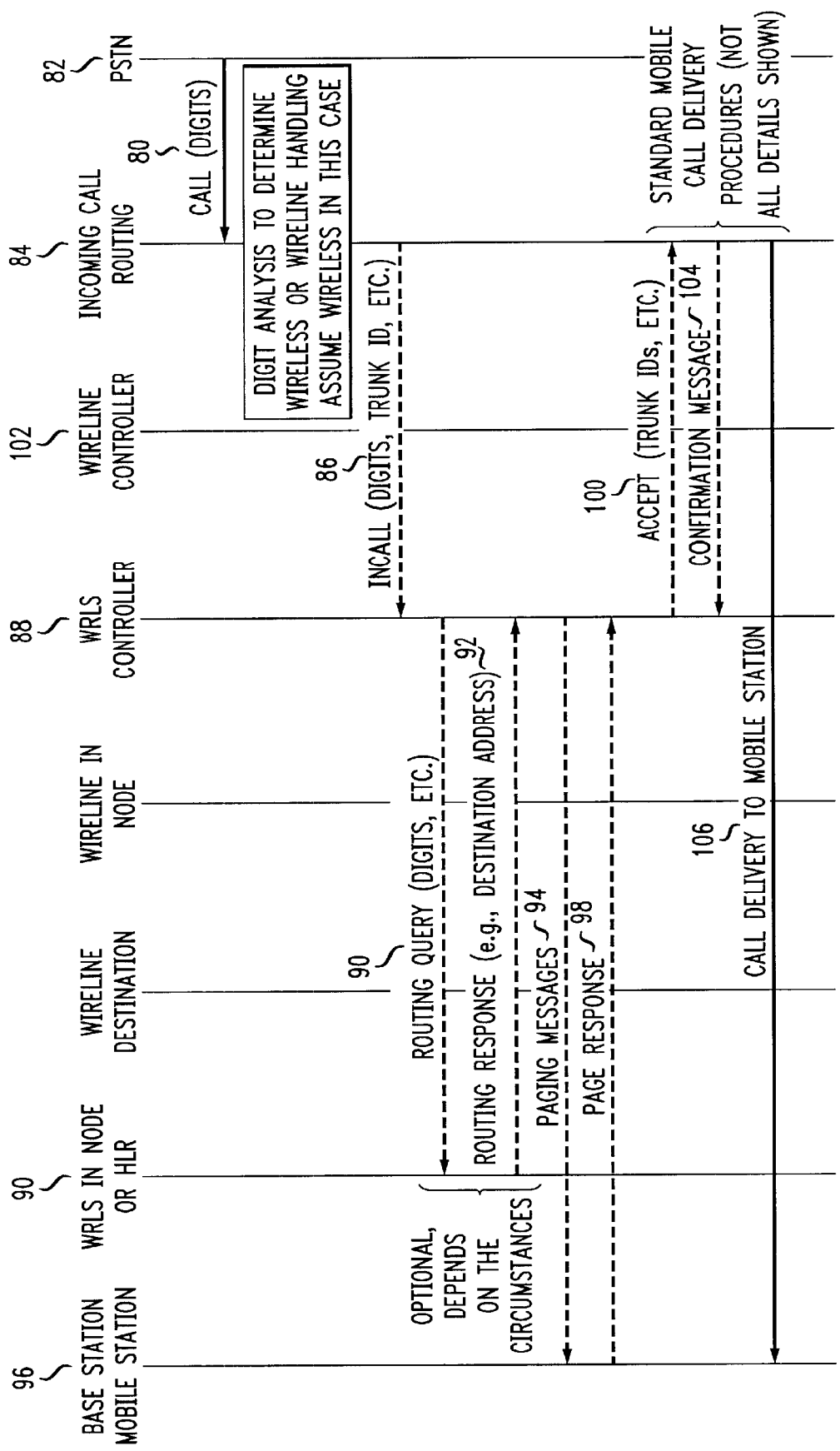
FIG. 5 illustrates a message flow diagram of an incoming call routing analysis routine for supporting shared trunk groups.
Figure 6:
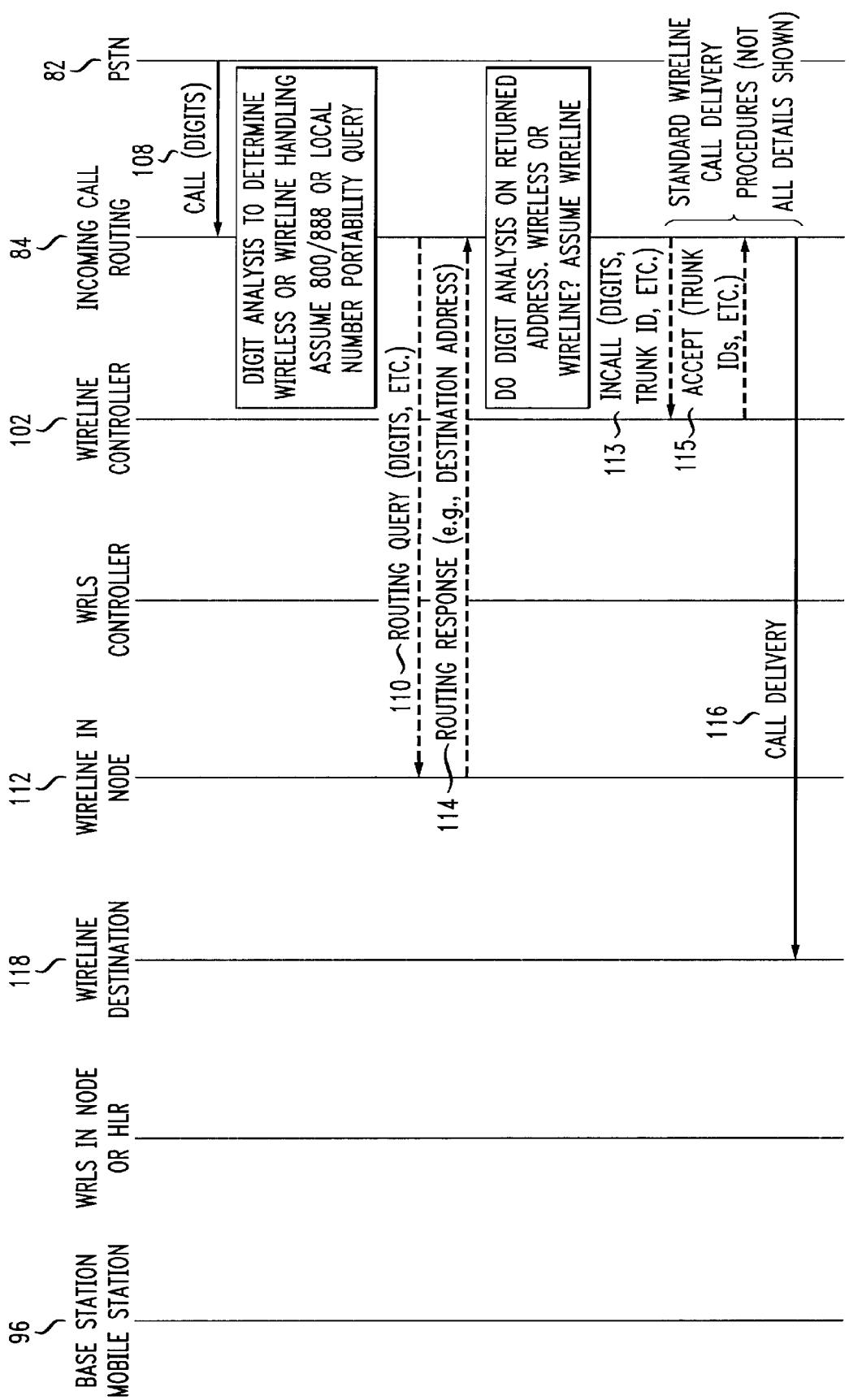
FIG. 6 illustrates a message flow diagram for shared application trunks where the incoming call is routed to a wireline destination.

FIG. 5 illustrates a message flow diagram for shared application trunks. An incoming call 80 from the public switched telephone network (PSTN) 82 is delivered via a shared trunk group to a switch where incoming call routing analysis 84 is performed on the incoming call numbers 80. The incoming call routing analysis 84 determines whether wireless or wireline components of the switch will handle the incoming call 80. The example in FIG. 5 illustrates the handling of a wireless call.

The incoming call routing analysis 84 transmits an incall message 86 to the wireless controller 88. The wireless controller 88 transmits a routing query message 90 to the wireless intelligent network or home location register 90 (intelligent network architectures, wireless intelligent network architectures and home location registers are well known in the art). The wireless intelligent network node 90 replies with a routing response 92 containing the destination address. The wireless controller 88 then routes a paging message 94 to the base station and mobile station 96 and receives a reply page response 98. The wireless controller 88 sends acceptance messages 100 to the incoming call routing analysis 84 and receives confirmation messages 104. The incoming call routing 84 then routes 106 the incoming wireless call 80 to the mobile station or base station 96.

Figure 8:
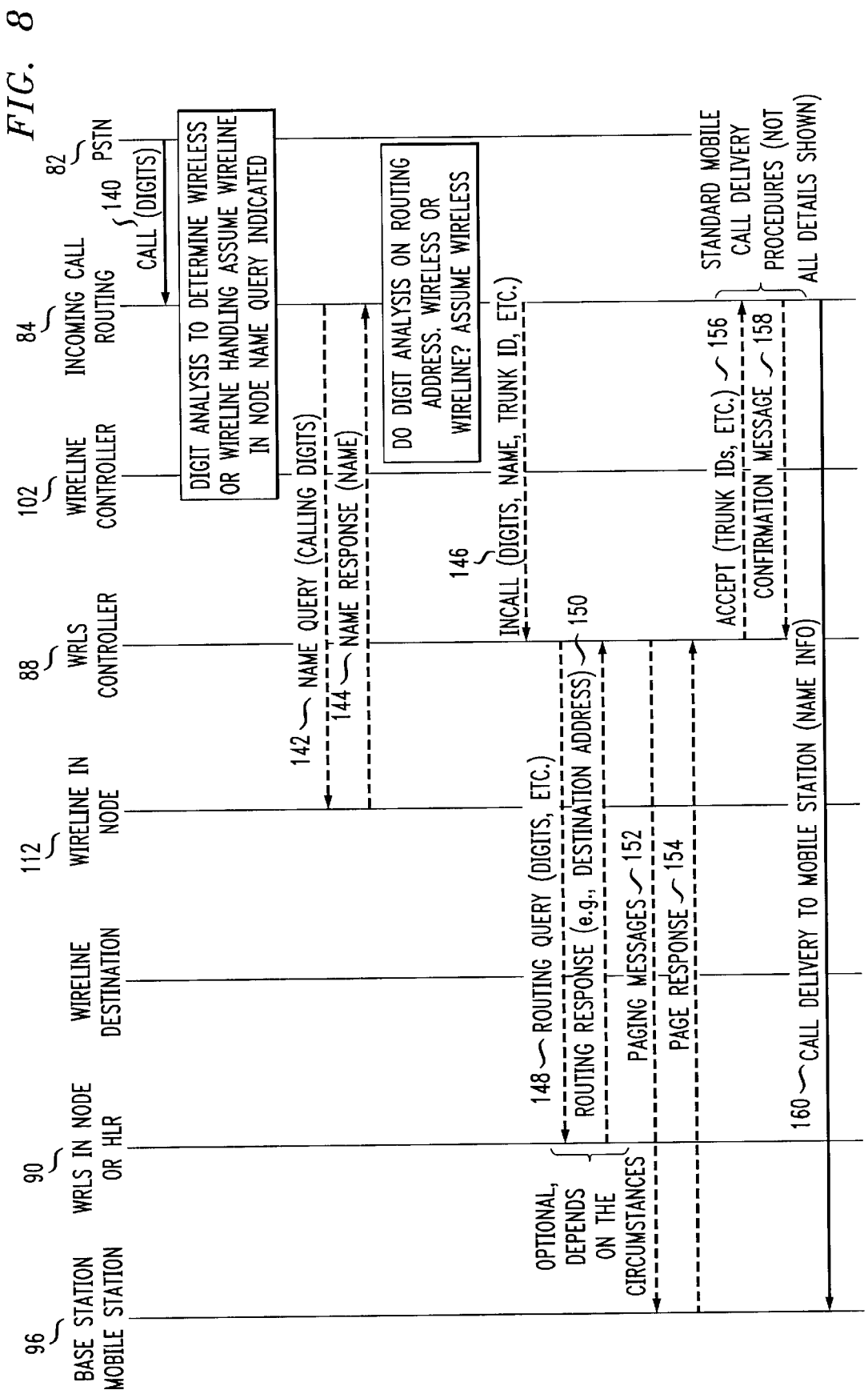
FIG. 8 illustrates a message flow diagram for shared application trunks.

FIG. 8 illustrates a message flow diagram for shared application trunks where the incoming call is routed to a wireline destination. An incoming call 108 from the public switched telephone network (PSTN) 82 is delivered via a shared trunk group to an incoming call routing analysis 84 in the switch. The incoming call routing analysis 84 determines whether the incoming call 108 requires wireless or wireline handling. In this example, the incoming call routing analysis 84 determines that the incoming call 108 seeks an 800/888 toll free called number or has local number portability capabilities. A routing query 110 is transmitted by the incoming call routing analysis 84 to the wireline intelligent network node 112 and a reply response 114 containing the destination address is transmitted by the wireline intelligent network node 112 to the incoming call routing analysis 84. The incoming call routing analysis 84 transmits an incall message 113 to the wireline controller 102 and receives an acceptance message 115. The incoming call routing 84 delivers the call 116 to the wireline destination 118.

Figure 7:
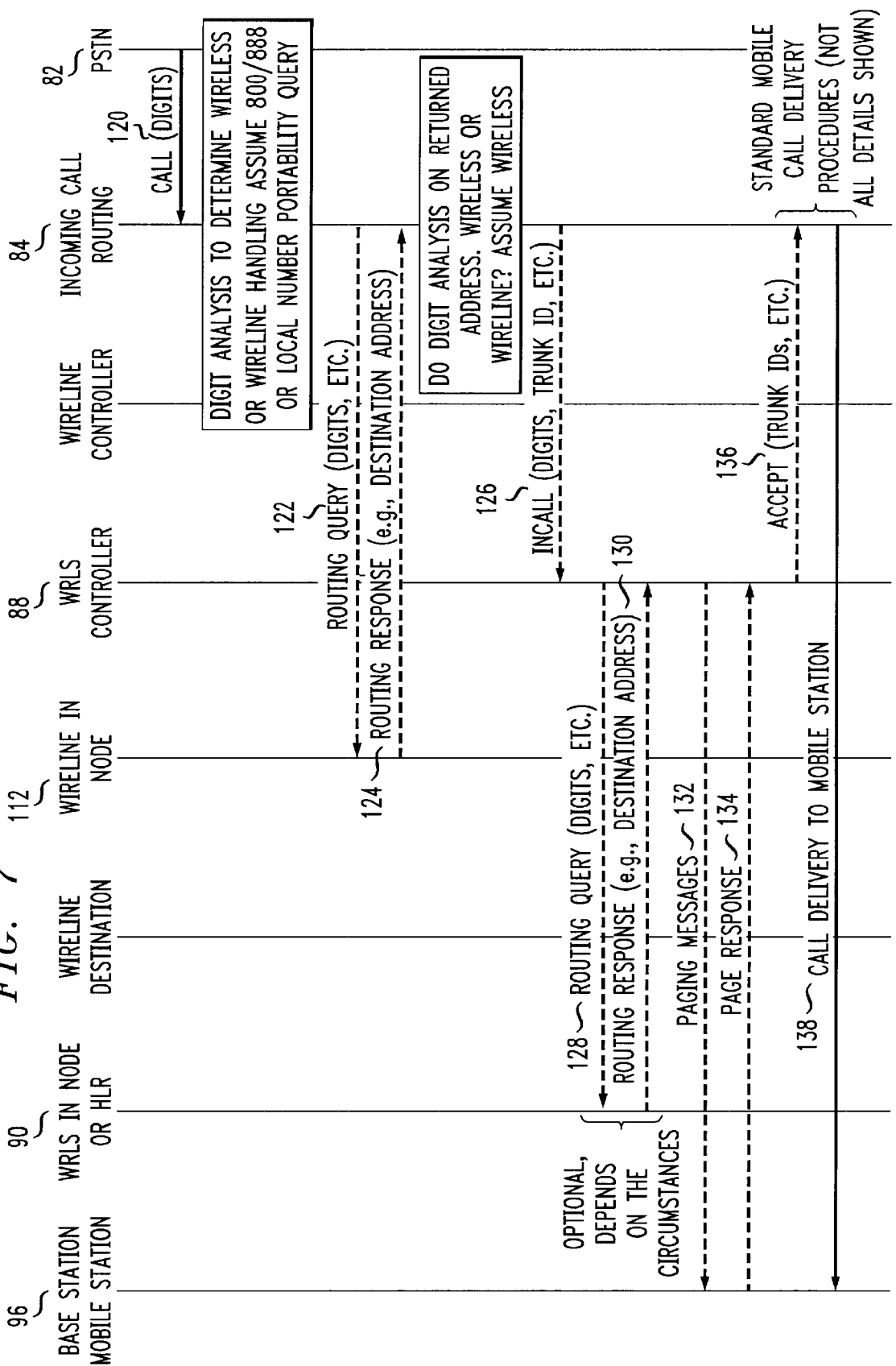
FIG. 7 illustrates a message flow diagram for shared application trunks where the incoming call is routed to a wireless destination after a wireline intelligent network query.

FIG. 7 illustrates a message flow diagram for shared application trunks where the incoming call is routed to a wireless destination after a wireline intelligent network query. An incoming call 120 from the public switched telephone network (PSTN) 82 is delivered via a shared trunk group to an incoming call routing analysis 84 to determine wireless or wireline handling. In this example, the incoming call routing analysis 84 determines that the incoming call 108 seeks an 800/888 toll free called number or has local number portability capabilities. The incoming call routing analysis 84 sends a routing query 122 to the wireline intelligent network node 112 and a routing response 124 containing the destination address returned. Incoming call routing analysis 84 is performed on the routing response 124 and a wireless routing is determined. An incall message 126 is sent to the wireless controller 88 by the incoming call routing analysis 84. The wireless controller 88 sends a routing query 128 to the wireless intelligent network node or home location register 90 and a reply routing response 130 containing the destination address is returned to the wireless controller 88. Paging messages 132 are transmitted from the wireless controller 88 to the base or mobile station 96 and a paging response 134 is returned to the wireless controller 88. The incoming call routing 84 accepts the trunk ID 136 from the wireless controller 88 and delivers 138 the incoming call 120 to the mobile station 96.

FIG. 8 illustrates a message flow diagram for shared application trunks. An incoming call 140 from the public switched telephone network (PSTN) 82 is delivered via a shared trunk group to an incoming call routing analysis 84. The incoming call routing analysis 84 performs a digit analysis to determine whether the incoming call 59 requires wireless or wireline lot handling.

The incoming call routing analysis 84 determines that the incoming call 140 is seeking a wireline intelligent node name query indicated. A name query 142 is transmitted by the incoming call routing analysis 84 to the wireline intelligent network node 112 and a reply name response 144 containing the routing address is returned. Incoming call routing analysis 84 is performed on the routing address and a determination is made that a wireless address was requested. The incoming call routing analysis transmits an incall message 146 to the wireless controller 88.

The wireless controller 88 transmits a routing query 148 to the wireless intelligent network node or home location register 90 and a reply routing response 150 is returned. The wireless controller 88 transmits paging messages 152 to the base or mobile station 96 and a reply page response 154 is returned. The incoming call routing 84 accepts the trunk IDs 156 and transmits a confirmation message 158 to the wireless controller 88. Then, incoming call routing 84 delivers 160 the incoming call 140 to the mobile station 96.

Figure 9:
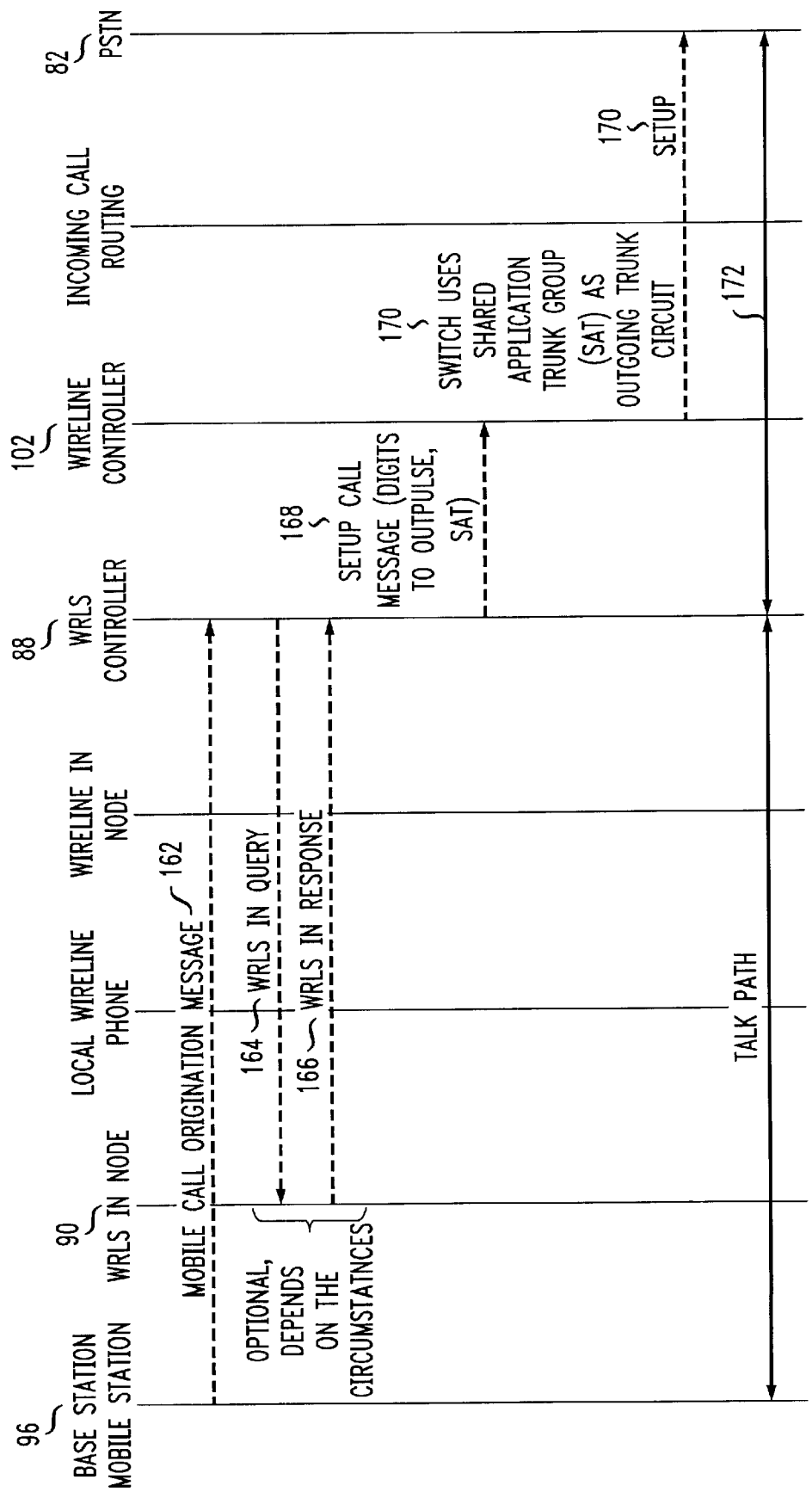
FIG. 9 illustrates a message flow diagram for the mobile station originating the call origination message.

FIG. 9 illustrates a message flow diagram for the mobile station originating the call origination message. The mobile or base station 96 transmits a mobile call origination message 162 to the wireless controller 88. The wireless controller 88 transmits a wireless intelligent network query 164 to the wireless intelligent network node 90 and a reply response 166 is returned. The wireless controller 88 sends a setup call message 168 to the wireline controller 102. The wireline controller 102 uses a shared application trunk group as setup 170 to the outgoing trunk circuit to the PSTN 82 and the outgoing voice path 172 is established.

FIG. 10 illustrates a message flow diagram for an origination wireline call transmission to the PSTN 82. A local wireline phone 174 transmits a wireline call origination message 176 to the wireline controller 102. The wireline controller 102 transmits a wireline intelligent network query 178 to the wireline intelligent network node 112 and a reply intelligent network response 180 is returned. The wireline controller 102 selects a shared application trunk group as the outgoing trunk circuit and provides call setup 182. The wireline controller 88 establishes a voice path 184 between the local wireline phone 174 and the PSTN 82.

The previous diagrams describe how modification of the incoming call routing analysis schemes, trunk groups can be used to carry both wireless and wireline traffic. The transmission of routing queries to and from the wireless and wireline intelligent networks, optimizes the switching system resources and eliminates the need for loop around trunks currently employed on LCO switches.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

We claim:

1. A method comprising the steps of:
employing, at a switch comprising a plurality of wireline components and a plurality of wireless components, a shared trunk group to support a call that is one or more of a wireless call and a wireline call;
when call routing analysis indicates that the call is a wireless call, routing the call to at least one of the wireless components of the switch;
when call routing analysis indicates that the call is a wireline call, routing the call to at least one of the wireline components of the switch;
processing the call without employing a loop around trunk to connect the wireless components and the wireline components at the switch.

2. The method of claim 1 wherein the step of employing the shared trunk group to communicate any one or more of the wireless call and the wireline call comprises the step of communicating the any one or more of the wireless call and the wireline call to a telecommunications switch.

3. The method of claim 2 wherein the step of employing the shared trunk group to communicate any one or more of the wireless call and the wireline call further comprises the step of enabling the any one or more of the wireless call and the wireline call to hunt across shared trunk groups.

4. The method of claim 2, wherein the step of employing the shared trunk group to communicate the any one or more of the wireless call and the wireline call further comprises the step of selecting the shared trunk group to comprise an incoming trunk group.

5. The method of claim 2, wherein the step of processing the any one or more of the wireless call and the wireline call at the switch based on the call routing analysis further comprises the step of analyzing the any one or more of the wireless call and the wireline call with switching software using databases to support a comparison of the any one or more of the wireless call and the wireline call with a local digit interpreter table.

6. The method of claim 2 wherein the step of employing the shared trunk group to communicate any one or more of the wireless call and the wireline call further comprises the step of performing call routing analysis on the any one or more of the wireless call and the wireline call.

7. The method of claim 6 wherein the step of employing the shared trunk group to communicate any one or more of the wireless call and the wireline call further comprises the step of processing the any one or more of the wireless call and the wireline call at the switch based on the call routing analysis.

8. The method of claim 7 wherein the step of employing the shared trunk group to communicate any one or more of the wireless call and the wireline call further comprises the step of initiating processing of called number digits associated with the any one or more of the wireless call and the wireline call in parallel with reception of the called number digits.

9. The method of claim 7 wherein the step of processing the any one or more of the wireless call and the wireline call at the switch based on call routing analysis further comprises the step of executing wireless related application code if the any one or more of the wireless call and the wireline call comprises a wireless call.

10. The method of claim 7 wherein the step of processing the any one or more of the wireless call and the wireline call at the switch based on call routing analysis further comprises the step of determining whether additional network assistance is required from an intelligent network node.

11. The method of claim 7 wherein the step of processing the any one or more of the wireless call and the wireline call at the switch based on call routing analysis further comprises the step of routing a message query to an intelligent network node based on the call routing analysis to ascertain a routing scheme.

12. The method of claim 1 wherein the step of routing the any one or more of the wireless call and the wireline call further comprises the step of routing the any one or more of the wireless call and the wireline call upon processing of the any one or more of the wireless call and the wireline call only once at the switch.

13. A system comprising:
a switch comprising a plurality of wireline components and a plurality of wireless components and at least one shared trunk group that supports a call, that is one or more of a wireless call and a wireline call, without employing a loop around trunk to connect the wireless components and the wireline components;
wherein the switch is arranged and constructed to route the call to at least one of the wireless components when call routing analysis indicates that the call is a wireless call;
wherein the switch is arranged and constructed to route the call to at least one of the wireline components when call routing analysis indicates that the call is a wireline call.

14. The system of claim 13 further comprising a telecommunications switch to which the shared trunk group for communicating any one or more of the wireless call and the wireline call is connected.

15. The system of claim 14 wherein the shared trunk group to communicate the any one or more of the wireless call and the wireline call further comprises an incoming trunk group.

16. The system of claim 14 further comprising
call processing software that performs call routing analysis on the any one or more of the wireless call and the wireline call.

17. The system of claim 16 wherein the call processing software further comprises a digit analysis routine that processes the any one or more of the wireless call and the wireline call at the switch.

18. The system of claim 17 wherein the digit analysis routine initiates processing of the called number digits associated with the any one or more of the wireless call and the wireline call in parallel with reception of the called number digits.

19. The system of claim 17 wherein the digit analysis routine further comprises a routine that selects wireless switch components if the any one or more of the wireless call and the wireline call comprises a wireless call and selects wireline switch components if the any one or more of the wireless call and the wireline call comprises a wireline call.

20. The system of claim 17 wherein the routine that processes the any one or more of the wireless call and the wireline call further comprises executing wireless related application code if the any one or more of the wireless call and the wireline call is a wireless call.

21. The system of claim 17 wherein the routine that processes the any one or more of the wireless call and the wireline call further comprises a switching module processor for determining whether additional network assistance is required from an intelligent network node.

22. The system of claim 17 wherein the routine that processes the any one or more of the wireless call and the wireline call further comprises a routine that routes a message query to an intelligent network node to ascertain a routing scheme for the called number.

23. The system of claim 17 wherein the digit analysis routine further comprises a routine for analyzing the any one or more of the wireless call and the wireline call with switching software using databases to support a comparison of the any one or more of the wireless call and the wireline call with a local digit interpreter table.

24. The system of claim 13 wherein the routine that routes the any one or more of the wireless call and the wireline call to wireless switch components if the any one or more of the wireless call and the wireline call comprises a wireless call and routes the any one or more of the wireless call and the wireline call to wireline switch components if the any one or more of the wireless call and the wireline call comprises a wireline call comprises routing the any one or more of the wireless call and the wireline call without processing the any one or more of the wireless call and the wireline call more than once at the switch.

* * * * *